No. 641,046. Patented Jan. 9, 1900.
H. E. SHARP.
FRICTION AND STOP CLUTCH.
(Application filed May 25, 1899.)
(No Model.)
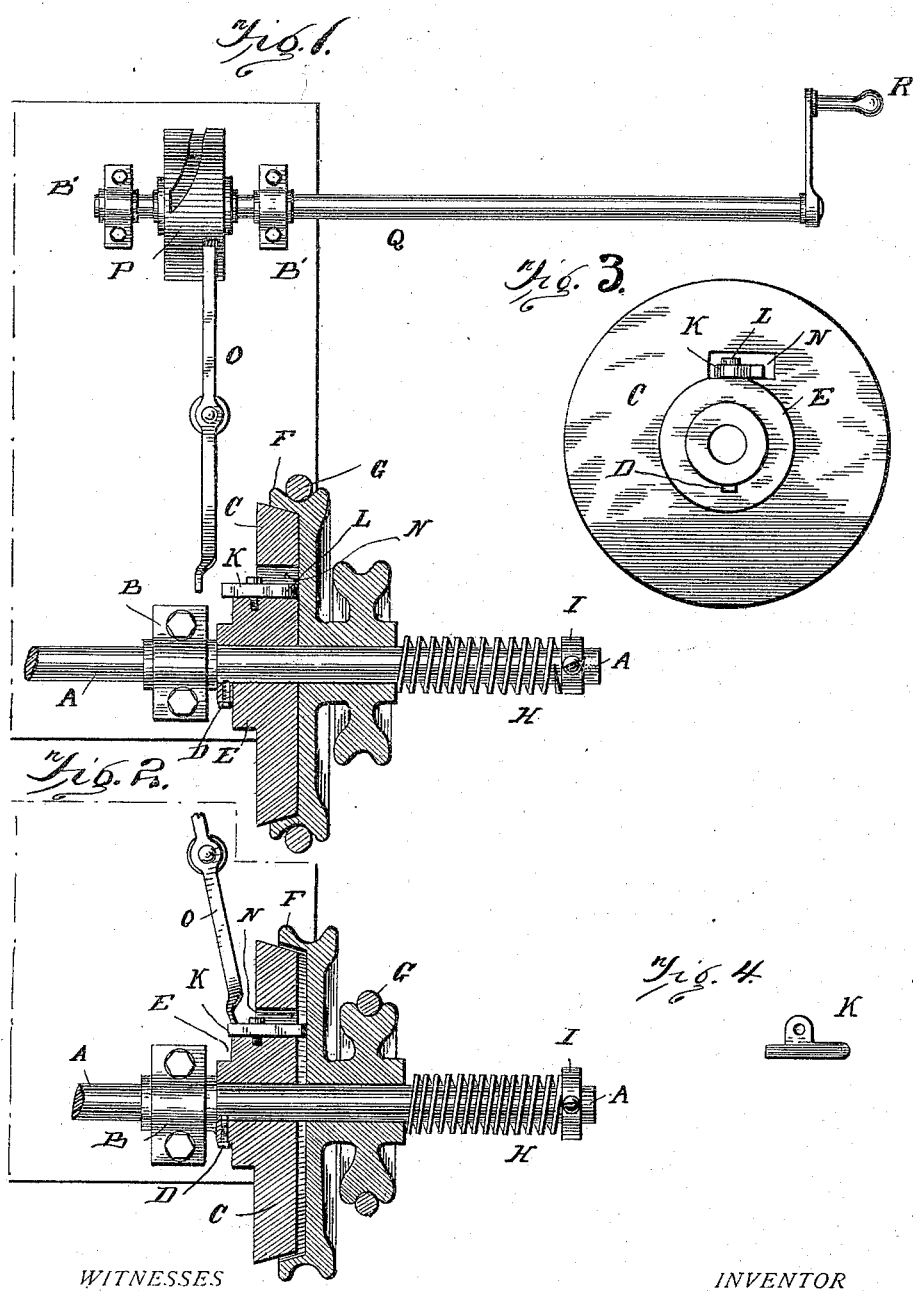
WITNESSES
Chas. K. Davies
M. C. Brown
INVENTOR
Henry E. Sharp
By W. H. Bartlett
Attorney

UNITED STATES PATENT OFFICE.

HENRY E. SHARP, OF NEWARK, NEW JERSEY.

FRICTION AND STOP CLUTCH.

SPECIFICATION forming part of Letters Patent No. 641,046, dated January 9, 1900.

Application filed May 25, 1899. Serial No. 718,166. (No model.)

*To all whom it may concern:*

Be it known that I, HENRY E. SHARP, a citizen of the United States, residing at Newark, in the county of Essex and State of New Jersey, have invented certain new and useful Improvements in Friction and Stop Clutches, of which the following is a specification, reference being had therein to the accompanying drawings.

This invention relates to a friction-clutch and detaching and stop mechanism therefor.

The object of the invention is to produce a shaft-driving clutch which shall engage easily and without shock with the driven mechanism and which can be uncoupled by the same mechanism which acts as a brake to stop the shaft.

Figure 1 is a partial plan and partial section of the essential parts of the mechanism of this clutch. Fig. 2 is a section of the clutch members, showing details of the mechanism sufficient to indicate the operation of the device. Fig. 3 is an end view of elevation of one of the clutch-pulleys and the detaching-button. Fig. 4 is a diagram of the detaching-button.

A indicates a driving-shaft for any light machine and is especially adapted for use in a cigar-machine. The shaft may be of any desirable length and supported in any usual bearings, as B.

C indicates a pulley or disk which is firmly fixed to the shaft, as by set-screw D passing through the integral hub E and locking this pulley or clutch member to the shaft. The pulley or clutch member C has a frusto-conical rim or periphery, as shown in the drawings and as common in friction-clutches.

The cup member F of the clutch is loose on shaft A, but is driven by suitable power—as, for instance, by belt G, which belt may run in a groove in either a small or the large part of the pulley, according to the speed desired. The cup portion of this clutch member has a beveled rim, which may be closed on the frusto-conical portion of the other member and make a neat frictional engagement. The cup member F is pressed toward the tapered member C by a coiled spring H, surrounding the shaft, and held in place by a collar I. The tendency of the spring is to close the cup member onto the conical member, so as to have the members in frictional engagement, when the power which drives part F will cause the part C and the shaft to rotate.

On the integral hub E of pulley C there is a flatted side, on which the uncoupling or crank lever K is mounted by a pivot L. This crank-lever can rock on its pivot, so that one of its arms projects through mortise N in the pulley C, but when not so rocked will be pressed back by the spring-pressed cup, allowing the clutch members to close together under the impulse of the spring H.

A detaching or detent lever O is pivoted in proximity to the hub E of the clutch member C, said lever O being suitably pivoted on the frame. When the free end of lever O is swung into the path of movement of the outer arm of lever K, this lever K will be swung on its fulcrum and one of its arms will be rocked through mortise L of the clutch member C, and so bear against the face of the cup member F, pressing the same back out of contact with member C. At the same time the lever O serves as a stop to prevent further rotation of the pulley C. Thus the shaft may be stopped instantly by means of the lever O, the uncoupling being effected by the same movement.

The shaft O may be rocked by engagement with a cam P on a counter-shaft Q, said counter-shaft having an operating-handle R and being preferably parallel with shaft A, as shown, in bearings B' B'. The partial rotation of shaft Q causes cam P to rock lever O into position to engage the crank or uncoupling lever K and to stop the machine by the uncoupling-lever remaining in contact with this detaching or detent lever O. To permit the machine to again start, it is only necessary to rock the shaft Q, so that the cam P moves lever O into the position of Fig. 1. For light machines which require to be stopped quickly, as in cigar-making machines, this mechanism for uncoupling and stopping the machine has been found very efficient.

What I claim is—

1. In a clutch, two clutch members on a shaft, a driven member having a beveled flange and being loosely on the shaft, a spring to press said member toward the other, a tapered clutch member having an integral hub fixed to the shaft, a rocking lever on said hub, and means to rock said rocking lever so that one of its arms projects through an opening in one clutch member and presses the two clutch members apart, all combined substantially as described.

2. In a clutch, the shaft, the disk C attached to the shaft and having a mortise therein, a lever mounted on the disk in position to swing through the mortise, the driven cup F loose on the shaft, means for pressing the clutch members into frictional contact, and a stop movable into position to rock the said lever and disconnect the clutch, and simultaneously to stop the shaft, substantially as described.

3. In a clutch, the clutch member loose on the shaft and means for driving it, a member fixed to the shaft and having a lever thereon which swings to force the clutch members apart, a spring by which the clutch members are normally forced into contact, a lever mounted on the frame in position to act as a rocking detent for the clutch-lever, and a rotating cam by which said detent-lever is operated, all combined substantially as described.

In testimony whereof I affix my signature in presence of two witnesses.

HENRY E. SHARP.

Witnesses:
A. M. CARD,
K. CRUGER.